United States Patent
Erath et al.

[19]

[11] Patent Number: 6,128,251
[45] Date of Patent: Oct. 3, 2000

[54] SOLID MARINE SEISMIC CABLE

[75] Inventors: Louis W. Erath, Abbeville, La.; Gary Craig; Michael Maples, both of Houston, Tex.; John Luscombe, Sugarland, Tex.

[73] Assignee: Syntron, Inc., Houston, Tex.

[21] Appl. No.: 09/418,883

[22] Filed: Oct. 15, 1999

Related U.S. Application Data

[63] Continuation-in-part of application No. 09/292,915, Apr. 16, 1999.

[51] Int. Cl.[7] .................................................. G01V 1/38
[52] U.S. Cl. .......................... 367/154; 367/20; 174/101.5
[58] Field of Search ............................. 367/20, 154, 153; 174/101.5; 114/244, 253

[56] References Cited

U.S. PATENT DOCUMENTS

| 5,550,791 | 8/1996 | Peloquin | 367/154 |
| 5,600,608 | 2/1997 | Weiss et al. | 367/20 |
| 5,632,841 | 5/1997 | Hellbaum et al. | 156/245 |
| 5,639,850 | 6/1997 | Bryant | 528/353 |
| 5,781,510 | 7/1998 | Chang et al. | 367/188 |

*Primary Examiner*—Ian J. Lobo
*Attorney, Agent, or Firm*—Felsman, Bradley, Vaden, Gunter & Dillon, L.L.P.

[57] ABSTRACT

An arcuate or flat ferroelectric sensor is incorporated in a seismic streamer. The structure comprises an interior cable, a surrounding woven strength member, an overlying foam floatation layer, and an enclosing jacket. One or more elongate channels are formed in the overlying floatation layer, and one or more hydrophones are mounted in the channel(s). The elongate channel enlarges the acoustic aperture for the reception of seismic signals.

18 Claims, 7 Drawing Sheets

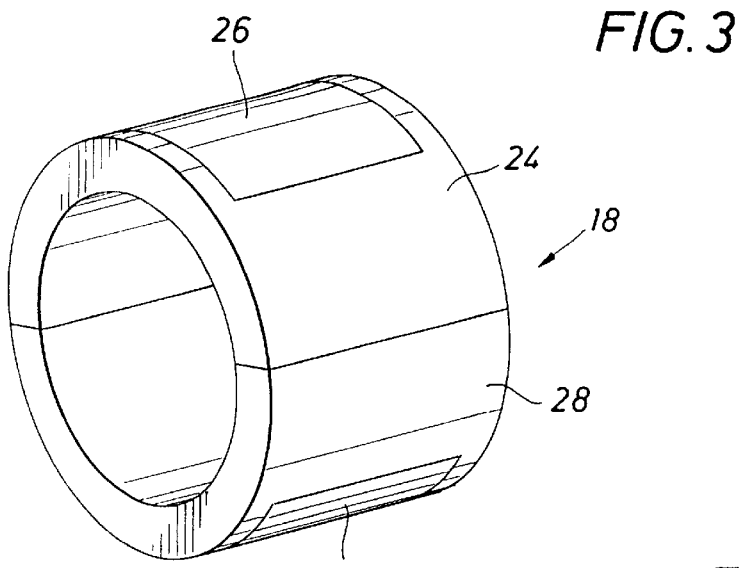
FIG. 3
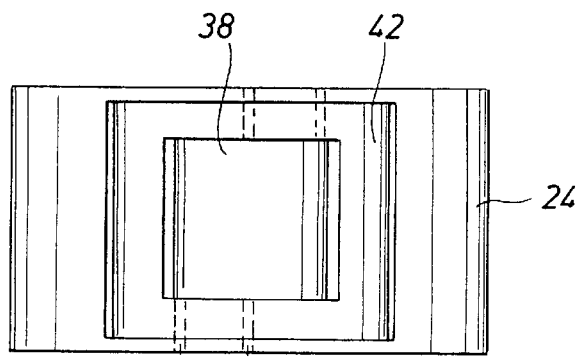
FIG. 4c
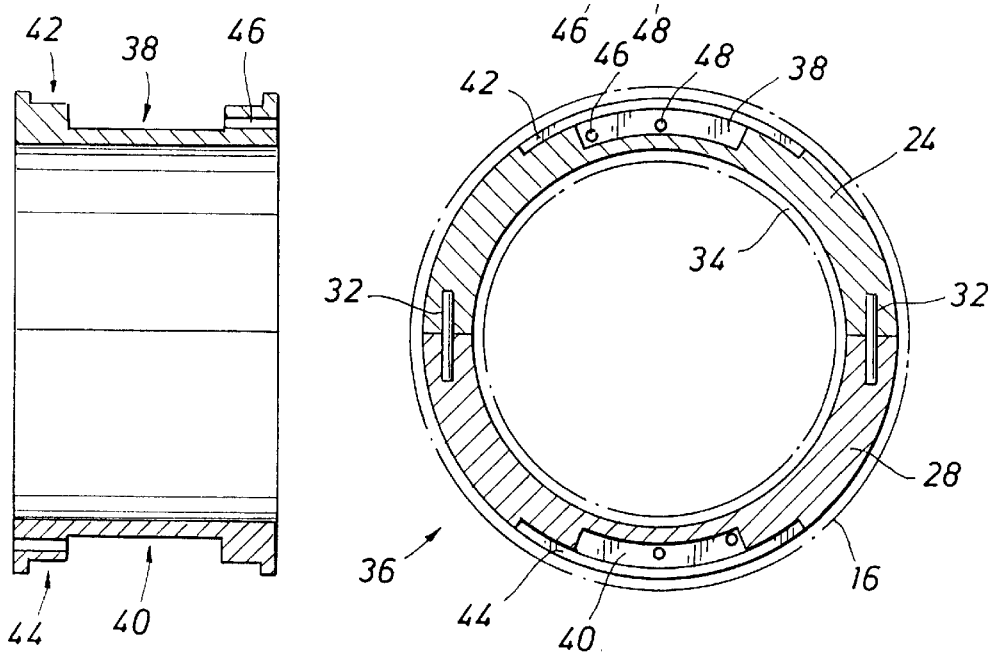
FIG. 4b
FIG. 4a

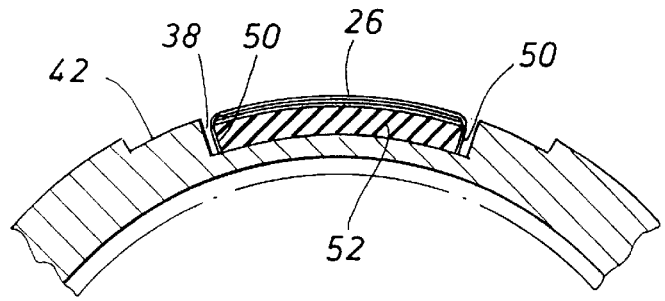
FIG. 5
FIG. 6a
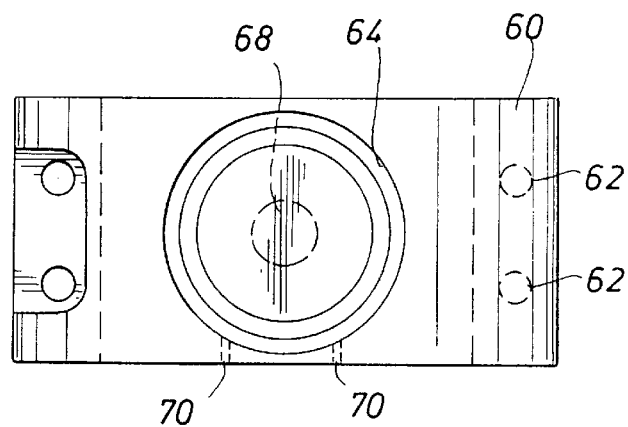
FIG. 6b
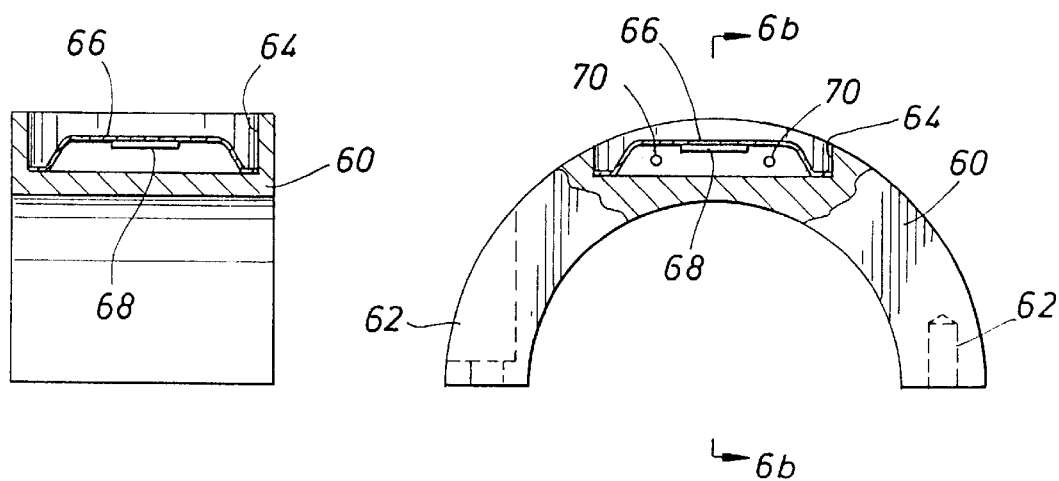
FIG. 6c

SOLID MARINE SEISMIC CABLE

This is a Continuation-in-Part of U.S. patent application Ser. No. 09/292,915, filed Apr. 16, 1999 allowed.

FIELD OF THE INVENTION

The present invention relates generally to the field of seismic streamers which are towed through water behind vessels for seismic exploration and, more particularly, to the field of solid hydrophone streamers.

BACKGROUND OF THE INVENTION

In modern marine seismic streamer systems, a vessel tows a long cable with a large number of sensors. Recent developments in such systems have simultaneously focused on making them light, durable, easy to manufacture and maintain, as well as sensitive to the acoustic signals of interest while remaining relatively immune to noise. These developments have lead to improvements in sensor elements, such as those disclosed in U.S. Pat. Nos. 5,541,894; 5,663,931; 5,677,894; and others. The sensor elements disclosed in these patents have been increasingly durable and eliminate the long vexing problem of distortion due to harmonics.

Another improvement in sensor technology was disclosed in U.S. Pat. No. 5,632,841 to Hellbaum et al. which teaches a method for forming piezoelectric wafers including a pre-stress layer. The method of Hellbaum et al. results in an arcuate sensor which is particularly sensitive to an acoustic signal.

The focus of U.S. patent application Ser. No. 09/292,915 allowed, the parent application to the present application, was a method and structure for incorporating the arcuate sensor of Hellbaum et al. into a manufacturable marine seismic streamer. Such a structure may use the arcuate sensor element of Hellbaum et al., or it may use more conventional flat or domed diaphragm elements with a conventional flat piezoelectric sensor.

Testing of the structure in the parent application has proved the efficacy of the structure disclosed therein, and has resulted in certain improvements and refinements, which are the focus of the present application. More particularly, we have found that a presumably acoustically inert jacket over a hydrophone sensor element in fact enlarges the acoustic aperture of the sensor. This discovery has lead to the development of the embodiments disclosed herein.

SUMMARY OF THE INVENTION

The present invention provides a structure in which a hydrophone sensor element is incorporated in a solid seismic streamer. In the broadest aspect of this invention, an exteriorly accessible elongate channel is formed in the surface of a marine seismic cable, a sensor element is mounted in the channel, and the channel is filled with a potting material. The elongated channel with the potting material enlarges the acoustic aperture of the sensor for the reception of seismic signals.

In a further aspect of the present invention, the well disclosed in U.S. patent application Ser. No. 09/292,915, allowed, is lengthened to form an elongated channel in which may be mounted one or a plurality of hydrophone sensor elements. The elongated channel is filled with a potting material, which functions much like oil in know marine seismic streamers. Thus, the elongated channel receives seismic signals over a greater area, effectively increasing the acoustic aperture of the sensor structure.

In another aspect of this invention, the structure comprises a solid marine streamer encased in a foamed polyethylene floatation material. The floatation casing has an elongated channel in which is mounted one or more hydrophone sensor elements. The elongated channel may be axial or radial, or a combination of such channels. The hydrophone sensor elements in any embodiment of this invention may be arcuate or flat disk elements, as described in U.S. patent application Ser. No. 09/292,915 allowed, incorporated herein by reference.

Once the hydrophone elements are mounted within the channel(s) in the metallic cylindrical halves surrounding the cable or in the floatation casing, and wired to the conductors in the cable, the channel is filled with a potting material, which conducts sound much like oil which has long been used to surround hydrophones. Then, the entire streamer is covered in a jacket, which protects the cable and enhances signal recovery by acting as a wider aperture for the reception of seismic signals.

These and other features of the present invention will be apparent to those skilled in the art from a review of the following detailed description.

BRIEF DESCRIPTION OF THE DRAWINGS

FIG. 3 is a perspective view of the sensor structure and its support.

FIGS. 4a, 4b, and 4c are end, top, and side views of the sensor structure and its support.

FIG. 5 is an enlarged end section view showing detail of the sensor support.

FIGS. 6a, 6b, and 6c are top, side, and end view of another preferred embodiment of the sensor structure and its support.

DETAILED DESCRIPTION OF A PREFERRED EMBODIMENT

Figure 1:
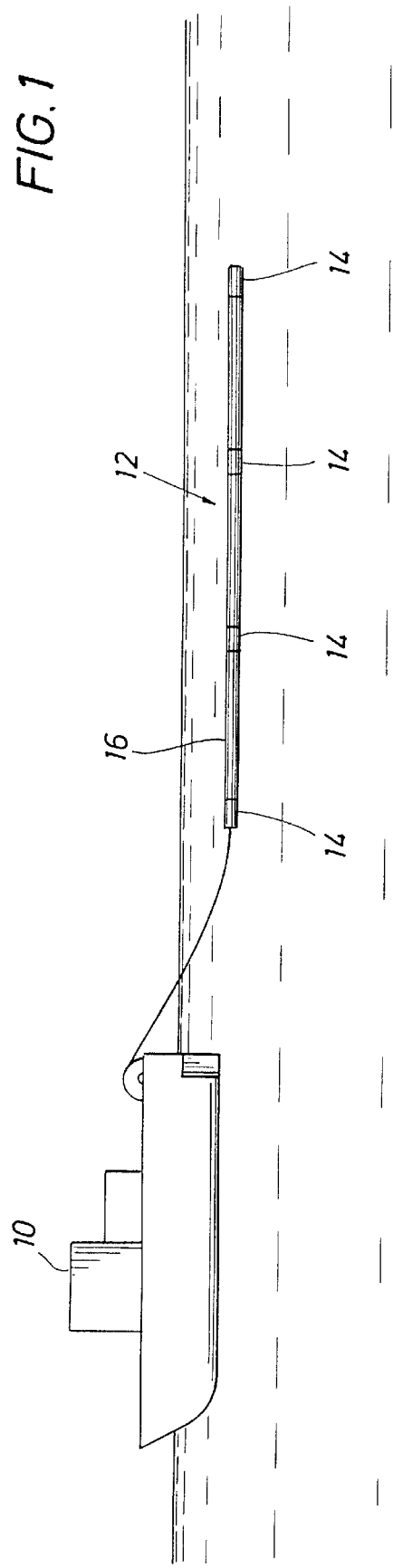
FIG. 1 is an overall schematic of a marine seismic system.

FIG. 1 depicts a schematic of a basic marine system including a vessel 10 towing a streamer 12. The streamer has a number of pieces of auxiliary equipment, such as depth control devices, associated with it that are not shown in order to simplify FIG. 1.

The streamer 12 also includes a number of sensor components 14 spaced apart along the streamer. The sensor components and buoyant material are sealed with a jacket 16, preferably made of polyurethane, to present a smooth profile to minimize flow noise. It is in the sensor components 14 wherein the present invention resides.

Figure 2:
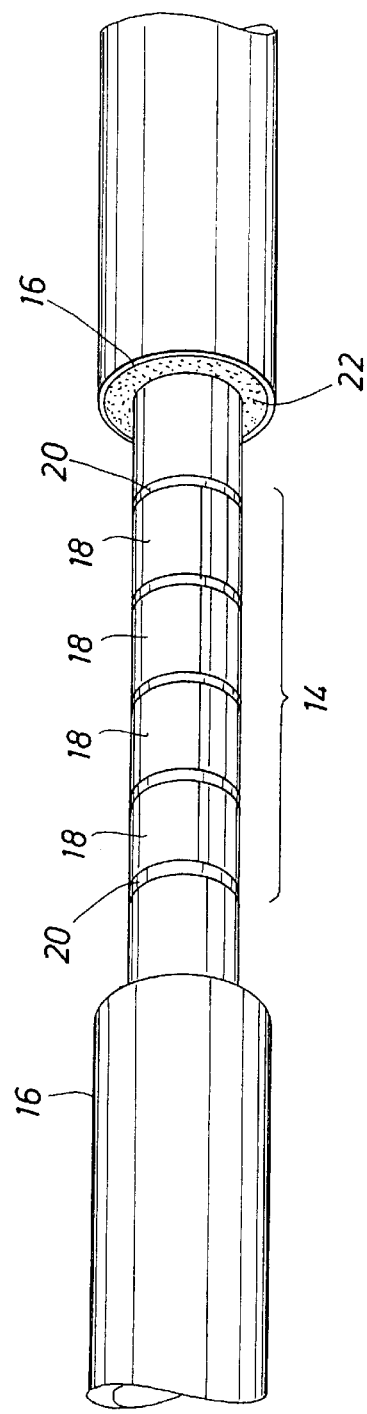
FIG. 2 is a partial cutaway view of a streamer cable.

FIG. 2 presents a detail view of a sensor component 14 in a segment of the streamer 12. A sensor component is made up of several sensor segments 18, of which four such segments are shown in FIG. 2. Each of the segments is separated from a neighboring segment by a compliant member such as plastic ring 20, which may preferably be made of sorbathane. The segments 18 and the rings 20 are covered by a foam 22, which in turn is covered by the jacket 16. In the embodiments depicted in FIGS. 9a through 9p, the segments 18 are eliminated, and the hydrophone elements are mounted in channels formed in the foam 22.

A sensor segment 18 is shown in more detail in FIGS. 3, 4a, 4b, and 4c. A segment 18 is primarily made up of an upper cylindrical half 24 which retains a sensor element 26 and a lower cylindrical half 28 which retains a sensor element 30. The sensor elements 26 and 30 may be formed as described in U.S. Pat. No. 5,632,841 and are available from FACE International Corporation, Norfolk, Va., under the trade name THUNDER. Each such element comprises a five-layer formation of 0.001" aluminum, 0.0005" silicon polyamide adhesive, 0.01" piezoelectric crystal such as lead zirconium titanate, 0.0005" silicon polyamide adhesive, and 0.015" beryllium copper. Alternatively, the sensor element 26 or 30 may be a disk or flat rectangular piezoelectric sensor, well known in the art.

Further details of a sensor segment are shown in FIGS. 4a, 4b, and 4c. FIG. 4a is a section view a sensor segment. The sensor segment is shown without the sensor element for clarity. The segment comprises the upper cylindrical half 24 and the lower cylindrical half 28, held together with appropriate means, such as pins 32, or preferably bolts. The upper and lower cylindrical halves fit snugly against a layer 34 of a compliant material for noise isolation, and are covered with the jacket 16.

The upper and lower cylindrical halves together form a sensor carrier 36 and are preferably machined from titanium. Machined into the carrier 36 is a top sensor well 38 and a bottom sensor well 40, which retain the sensors. A top shallow depression 42 and a bottom shallow depression 44 provide a volume for the placement of a sealing material, such as neoprene rubber, to retain the sensors and provide a smooth contour. The wells 38 and 40 and the depressions 42 and 44 are shown in profile in FIG. 4b. Also machined through the halves 24 and 28 are a pair of sensor lead ports 46 and 48. In assembling the sensor assembly, the sensor leads are fed through the lead ports and coupled to other sensors in a group to form a group of hydrophones.

FIG. 5 shows additional details of the mounting of the sensor 26 within the well 38. In one aspect of the present invention, the pre-formed arcuate sensor 26 fits into the well 38. As previously described, the sensor comprises a plurality of layers, one of which is beryllium copper. The beryllium copper layer of the sensor is extended beyond the other layers to form a set of tabs 50, which are bent over toward the other layers. Beneath the sensor may be formed a void, but preferably a compliant rubber pedestal 52 is formed to provide a backing for the sensor 26. The pedestal 52 may also be of a metal, or even machined in place on the support.

FIGS. 6a, 6b, and 6c depict another preferred embodiment of this invention, in which a conventional flat piezoelectric element is used. The support structure comprises an upper cylindrical half 60 which bolts to a lower cylindrical half (not shown) as with bolts 62. This structure defines a cylindrical well 64 to receive a diaphragm 66 on which is mounted a flat piezoelectric element 68. The diaphragm as shown in FIG. 6c may be substantially dome-shaped, with a flat top portion to receive the flat piezoelectric element. The diaphragm and piezoelectric element are then secured onto the support structure with a sound-transmissive material, such as a potting material, that will behave like a liquid in distributing pressure. The leads from the sensor run through holes 70 to the cable.

Figure 7:
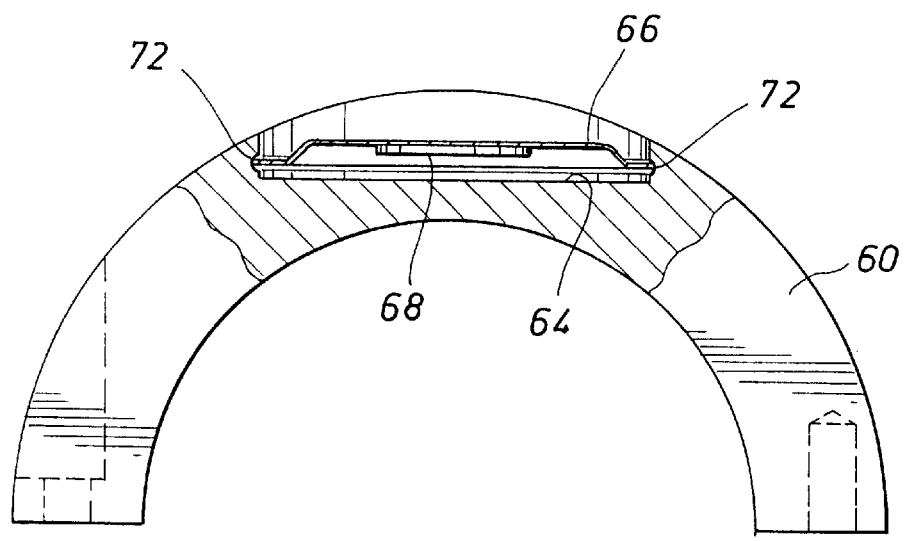
FIG. 7 is an enlarged end section view showing detail of the sensor support using a domed-shaped diaphragm.
Figure 8:
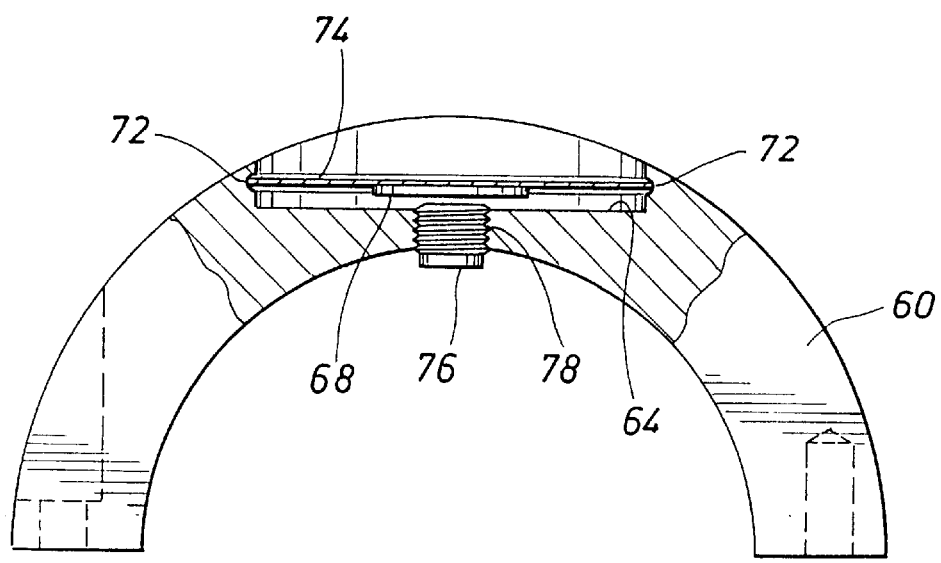
FIG. 8 is an enlarged end section view showing detail of the sensor support using a flat diaphragm and further including a depth-limiting device.

FIG. 7 depicts a variation of the embodiment of FIGS. 6a, 6b, and 6c. The upper cylindrical half 60 includes a circular well 64, and a detent 72 is formed in the wall of the well 64 to receive the dome-shaped diaphragm 66. Rather than a detent, other equivalent structures may be used, such as a counter sunk shelf, on which the diaphragm is then potted, and other structures. FIG. 8 depicts an upper cylindrical half 60 with cylindrical well 64, which in this case supports a flat diaphragm 74 on which is mounted the piezoelectric element 68. The embodiment of FIG. 8 further includes another feature of this invention, a set screw 76 which screws into a threaded hole 78. This feature limits the depth at which the hydrophone functions, since at depth the diaphragm 66 or 74 will be forced down upon the set screw and will therefore no longer flex in response to an acoustic signal. The set screw is preferably adjusted while the structure is subjected to pressure, then secured in place as with potting material, locktite, or the like.

Figure 9A:
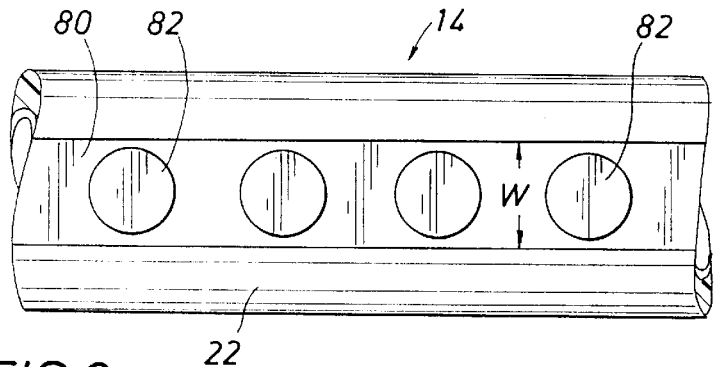
FIGS. 9a through 9p depict side and end views of various embodiments of the channel-mounted hydrophone elements of this invention.
Figure 9B:
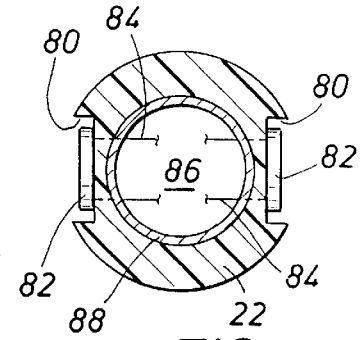
Figure 9C:
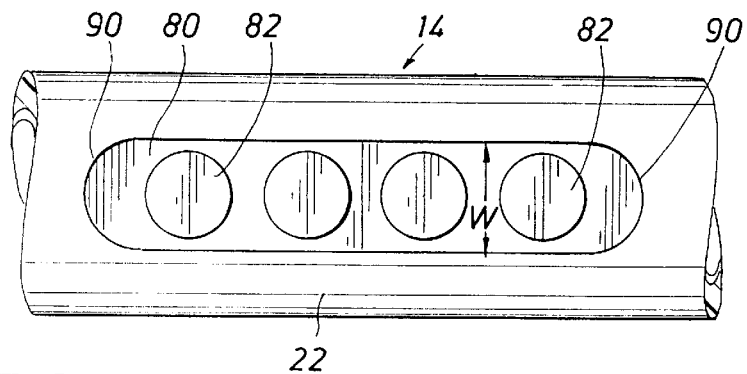
Figure 9D:
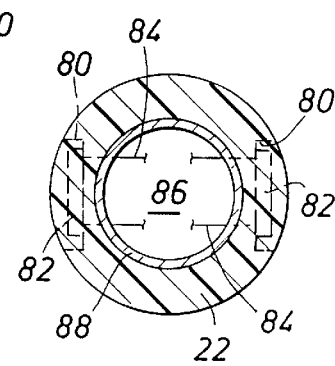
Figure 9E:
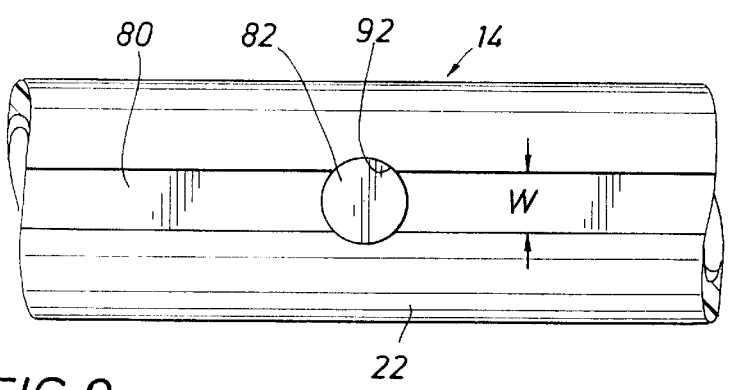
Figure 9F:
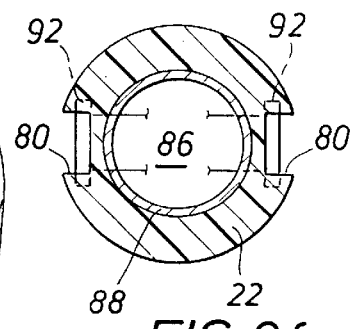
Figure 9G:
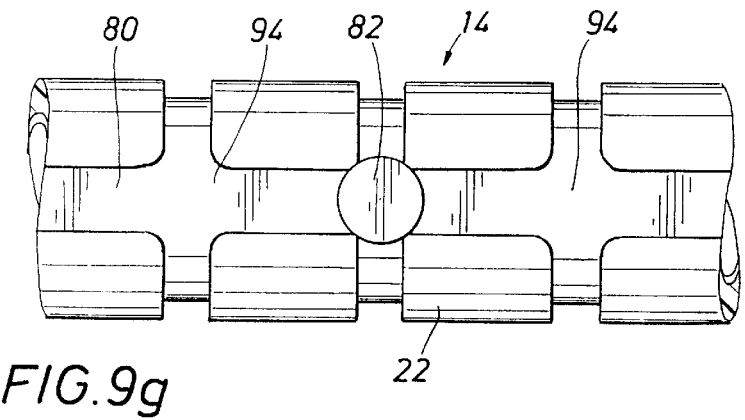
Figure 9H:
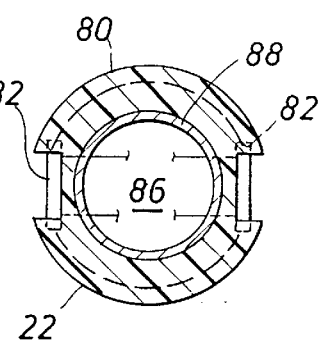
Figure 9I:
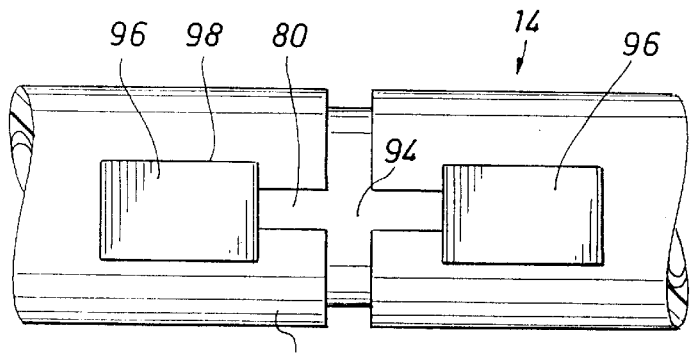
Figure 9J:
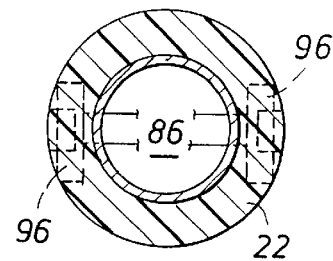
Figure 9K:
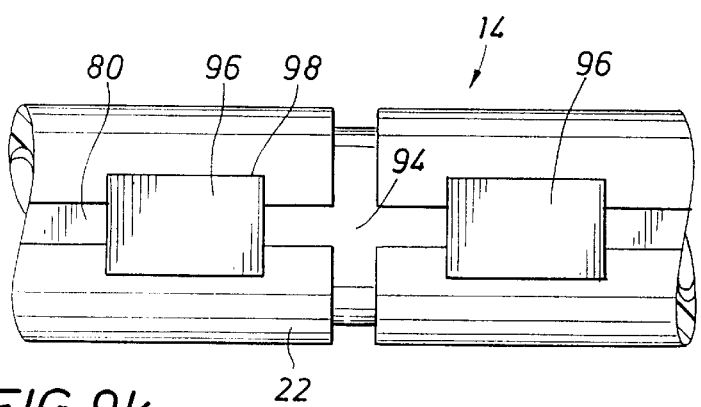
Figure 9L:
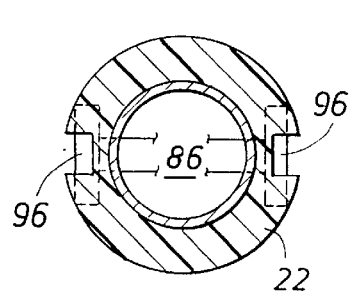
Figure 9M:
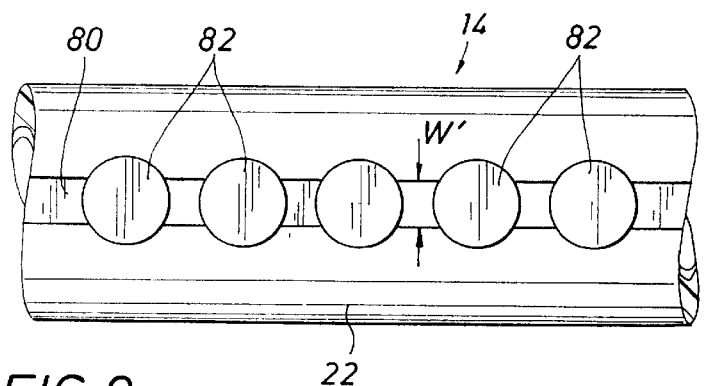
Figure 9N:
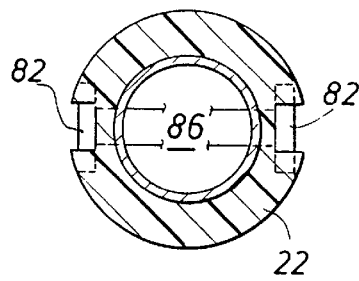
Figure 9O:
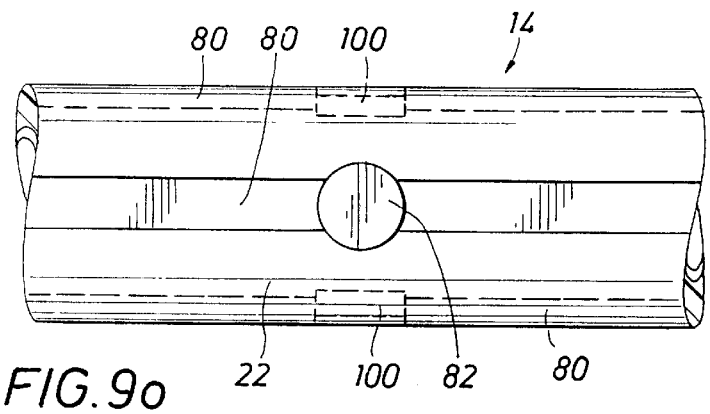
Figure 9P:
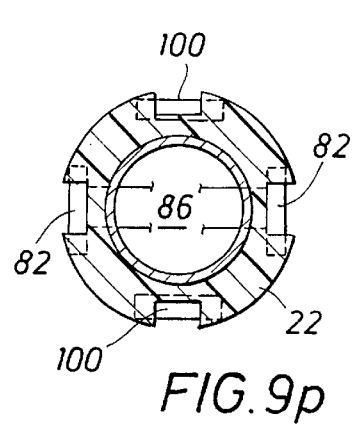
Figure 10:
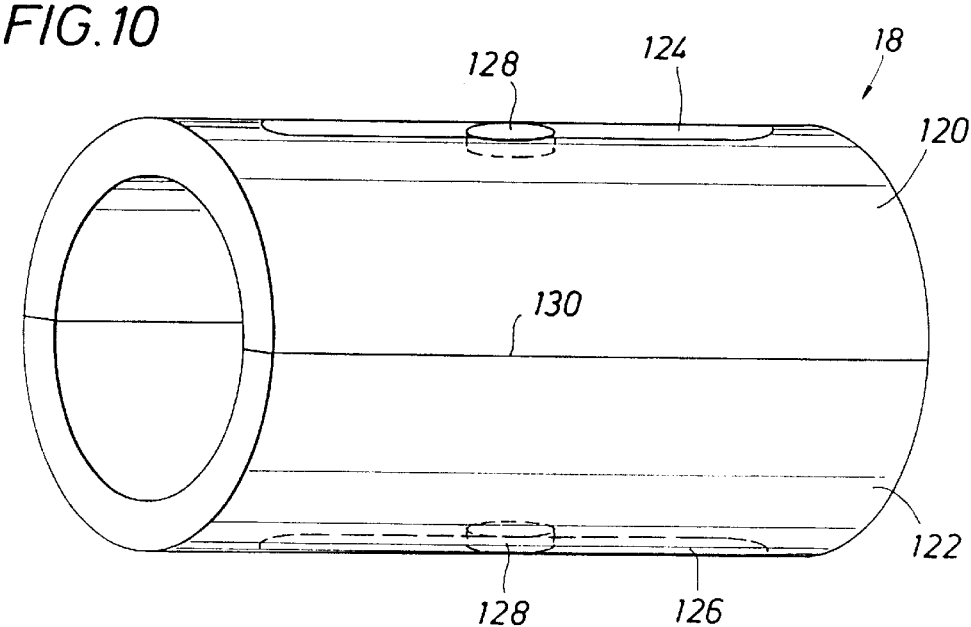
FIG. 10 is a perspective view of the sensor structure and its support in which the sensor is mounted in an elongate channel formed in a metallic cylinder surrounding the cable.

FIGS. 9a through 9p depict a variety of embodiments of the present invention in which the sensor component 14 has eliminated the sensor segments 18. Rather, in each instance of the sensor component 14 of FIGS. 9a through 9p, a channel 80 is formed in the foam floatation layer 22, and hydrophone elements are mounted in the channel 80. In each instance, the channel is then filled with an appropriate potting material, such as neoprene rubber or other material, and the sensor component 14 is covered in a jacket 16 as previously described.

FIGS. 9a and 9b depict a sensor component 14 which includes a foam floatation layer 22. An elongate channel 80 is formed in the foam floatation layer 22 and one or more single element flat disc hydrophones 82, known in the art, are mounted in the channel. We have found that the elongated channel enlarges the aperture for the reception of seismic signals. It is to be understood that leads 84 from each hydrophone 82 must be wired to electrical conductors in the interior 86 of the cable. The interior 86 of the cable includes copper and fiber optic filaments, and other components well known in the art. The layer 22 and the interior 86 of the cable are preferably separated by a double-woven strength bearing member 88 of Kevlar™ or other appropriate material.

The channel 80 of FIG. 9a runs the entire length of the sensor component 14. In contrast, the channel 80 in the embodiment of FIGS. 9c and 9c is enclosed by channel ends 90. While the enclosed channel makes the acoustic aperture slightly smaller, this embodiment increases the mechanical strength of the sensor component 14 to better withstand bending moments.

In each of FIGS. 9a and 9c, the channel 80 defines a width W which is greater than the width of a hydrophone. However, as shown in FIGS. 9e and 9f, this need not be so. The channel 80 in this instance defines a channel width W'. The hydrophone 82 is then mounted in its own well 92 within the channel. Also note that in FIG. 9e, only a single hydrophone 92 is shown. This hydrophone still receives the benefit of the enlarged aperture, due to the elongated channel, which is shown as extending the length of the sensor component 14. The channel could also be closed ended, as in FIG. 9c.

In each of FIGS. 9a through 9f, the channel 80 has been an elongated axial channel. However, the acoustic aperture may also be enlarged with a radial channel, as shown in FIG. 9g. In this case, the hydrophone 82 is mounted in its own well within the channel 80, and the channel further includes radial components girdling the sensor component 14. This embodiment receives an acoustic signal from 360° around the component 14, with an enlarged aperture for the hydrophone 82. The channel structure of this embodiment defines a plurality of intersections 94 of the axial and radial channel portions, and a hydrophone may be mounted at any such intersection, or in all of them, as necessary for signal strength.

In each of FIGS. 9a through 9h, the hydrophone has been depicted as a flat disc. FIGS. 9i and 9k illustrate that the present invention is equally adaptable to rectangular hydrophones 96, known in the art, as well as the THUNDER™ element previously described herein and in U.S. Pat. No. 5,632,841. Such hydrophones may be mounted in separate wells 98, as shown in FIGS. 9i and 9k, or in channels of width W, as in FIGS. 9a and 9c. Further, this embodiment may includes axial and radial channels, and the axial channel may be limited in length, as in FIG. 9i, or it may run the entire length of the component 14, as in FIG. 9k.

The sensor component 14 of FIGS. 9m and 9n is the same as that of FIGS. 9e and 9f, except that a plurality of hydrophones 82 within a channel of width W' are included. The sensor component 14 of FIGS. 9o and 9p is the same as that of FIGS. 9e and 9f, except that quadrature elements 100 are included, to enhance signal reception from these quarters.

A currently preferred embodiment of a sensor segment 18 is shown in FIGS. 10 and 11a–11d. A segment 18 is primarily made up of an upper elongated cylindrical half 120 and a lower cylindrical half 122. Elongated channels 124 and 126 are formed in the upper and lower elongated cylindrical halves 120 and 122, respectively, instead of the wells 38 and 40 of FIGS. 4a–4c. Disk hydrophone sensors 128 are mounted in the channels 124 and 126, and the channels are filled with a potting material. It has been found that the potting material makes the channels behave as if they were filled with oil, and thus the elongated channels in the cylindrical halves greatly enhance the aperture for the reception or seismic signals. The cylindrical halves are preferably made of an easily formed metal, such as aluminum, but they may also be formed of plastic or other appropriate material. The cylindrical halves 120 and 122 are in abutting contact at a seam 130, and the halves are held together by any appropriate means as described with regard to FIG. 4a.

Figure 11A:
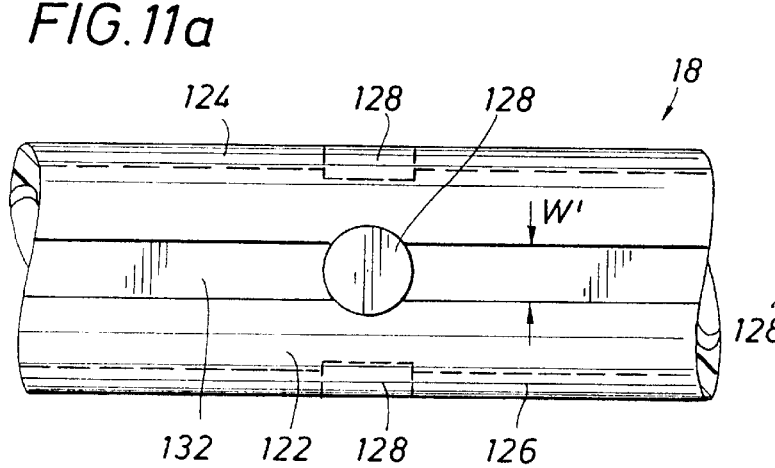
FIGS. 11a through 11d depict side and end views of embodiments of the hydrophone of the embodiment with sensors mounted on elongate channels formed in a metallic cylinder.
Figure 11B:
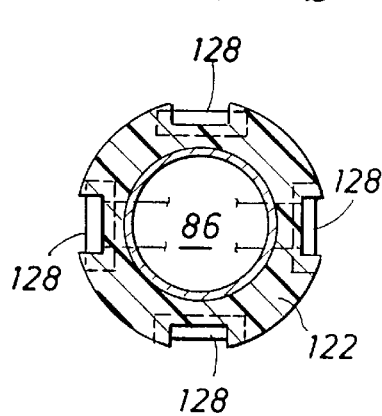

FIGS. 11a through 11d depict two additional variations of the present invention in which the hydrophone sensor component 128 is mounted in an elongated channel. In FIGS. 11a and 11b, the cylindrical half 122 also includes a channel 132, so that this structure includes four channel arranged 90° apart, with a hydrophone sensor component in each of the channels. Each of the channels extends the length of the segment 18, and each defines a width W', which is narrower than the width of a hydrophone sensor 128.

Figure 11C:
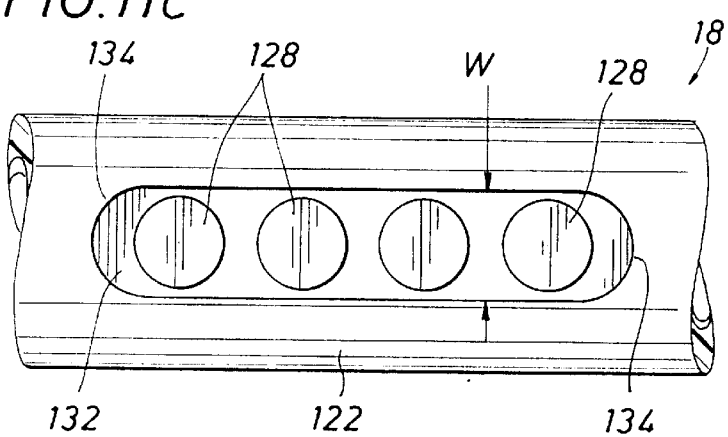
Figure 11D:
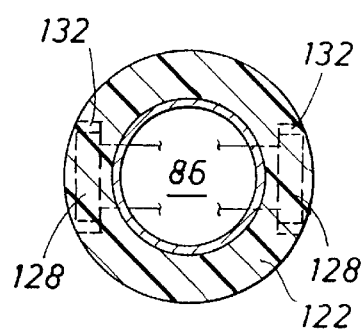

A shown in FIGS. 11c and 11d, a plurality of hydrophone sensors 128 may be included in a channel 132. Including a plurality of hydrophone sensors 128 increases the total effective signal received by the system. In this case the channel defines a width W, which is wider than the width of a hydrophone sensor 128. Also, the channels do not extend the length of the segment 18, but are closed by an end 134.

The present invention provides a number of advantages to hydrophone sensor structures previous in use in the art. For example, the assembly is easy to assemble into a complete marine seismic streamer and, if a sensor element should fail, is particularly suited to removal of the failed element and a replacement installed in its place. It presents a very rugged package with a smooth profile to minimize flow noise. The structure disclosed herein also eliminates a discrete hydrophone carrier, since the hydrophones are mounted in wells or channels formed in the foam floatation layer of the cable. This structure also enhances acoustic signal reception because the elongated channels increase the acoustic aperture.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A hydrophone component on a seismic cable comprising:
   a. a cable interior;
   b. a woven strength member around the cable interior;
   c. an elongated axial channel on the outside of the strength member; and
   d. a hydrophone in the channel.

2. The hydrophone component of claim 1, further comprising a jacket surrounding the component.

3. The hydrophone component of claim 1, further comprising an elongated metallic cylinder wherein the channel is formed.

4. The hydrophone component of claim 1, further comprising a foam layer around the strength member wherein the channel is formed.

5. The hydrophone component of claim 1, wherein the hydrophone comprises a flat disk hydrophone.

6. The hydrophone component of claim 1, wherein each sensor comprises an arcuate sensor having a plurality of layers.

7. The hydrophone component of claim 1, further comprising a plurality of hydrophones in the channel.

8. The hydrophone component of claim 1, wherein the channel defines a channel width and the hydrophone defines a hydrophone width and the channel width is greater than the hydrophone width.

9. The hydrophone component of claim 4, wherein the channel defines a plurality of depressions formed in the foam layer, at least one of the depressions being axially oriented and at least one of the depressions being radially oriented.

10. The hydrophone component of claim 1, further comprising
    a. a complementary channel on the hydrophone component opposite the channel; and
    b. a second hydrophone located in the complementary channel.

11. The hydrophone component of claim 1, further comprising a well in the channel, and wherein the hydrophone is mounted in the well.

12. The hydrophone component of claim 11, wherein the well is circular in cross section, and the hydrophone is a flat disk.

13. The hydrophone component of claim 11, wherein the well is rectangular in cross section, and the hydrophone includes a rectangular piezoelectric element.

14. A marine seismic cable comprising:
   a. a cable interior;
   b. a woven strength member around the cable interior;
   c. a plurality of sensor segments, each sensor segment separated from an adjacent sensor segment by a compliant member; each of the plurality of sensor segments comprising:
      i. an upper half cylinder and a lower half cylinder coupled together around the strength member;
      ii. an elongated channel formed in each of the upper half cylinder and the lower half cylinder;
      iii. a hydrophone sensor element mounted in each channel; and
      iv. a potting material filling each channel.

15. The cable of claim 14, wherein each channel is axially oriented.

16. The cable of claim 14, further comprising a plurality of hydrophone sensor elements in each channel.

17. The cable of claim 14, wherein each channel runs the length of the sensor segment.

18. The cable of claim 14, wherein each channel defines a length which is less than the length of a sensor segment.

* * * * *